United States Patent [19]

Rohrer

[11] 4,024,971

[45] May 24, 1977

[54] EQUIPMENT LOADER AND UNLOADER FOR VEHICLES

[75] Inventor: Daniel F. Rohrer, Hillsboro, Oreg.

[73] Assignee: Ralph M. Eide, Lake Oswego, Oreg.

[22] Filed: Sept. 19, 1975

[21] Appl. No.: 614,909

Related U.S. Application Data

[63] Continuation of Ser. No. 459,946, April 11, 1974, abandoned.

[52] U.S. Cl. .......................... 214/450; 224/42.1 H
[51] Int. Cl.² ............................................ B60R 9/00
[58] Field of Search ..................... 214/450, 517; 224/42.1 R, 42.1 H, 42.1 F, 42.03 R, 42.1 G

[56] References Cited

UNITED STATES PATENTS

| | | | |
|---|---|---|---|
| 3,608,758 | 9/1971 | Dolbin | 214/450 |
| 3,612,314 | 10/1971 | Cooper | 214/450 |
| 3,716,156 | 2/1973 | Risney | 214/450 |
| 3,819,074 | 6/1974 | Oliver | 214/450 |
| 3,830,389 | 8/1974 | Van Acker | 214/450 |

FOREIGN PATENTS OR APPLICATIONS 463,292  11/1968  Switzerland .................. 224/42.1 G

*Primary Examiner*—Joseph F. Peters, Jr.
*Assistant Examiner*—Michael J. Forman
*Attorney, Agent, or Firm*—Eugene M. Eckelman

[57] ABSTRACT

A pair of longitudinally extending side rail assemblies are arranged to be mounted on the top of a vehicle, and these rail assemblies adjustably support transverse rollers at selected positions along their length. One of the rollers is driven by a motor, and this powered roller serves as a winch drum for lines serving upon selected rotation of the roller to raise a piece of equipment from a horizontal position behind the vehicle to an upright position and furthermore to pull such equipment over onto the top of the vehicle. Reverse movement of the winch roller moves the piece of equipment rearwardly and the lines lay the equipment down on the ground in the horizontal position. Tie-down lines are provided which support the rearward portion of the piece of equipment off the ground in portions of the loading and unloading operations. These tie-down lines also assist in tying the equipment down when loaded.

8 Claims, 5 Drawing Figures

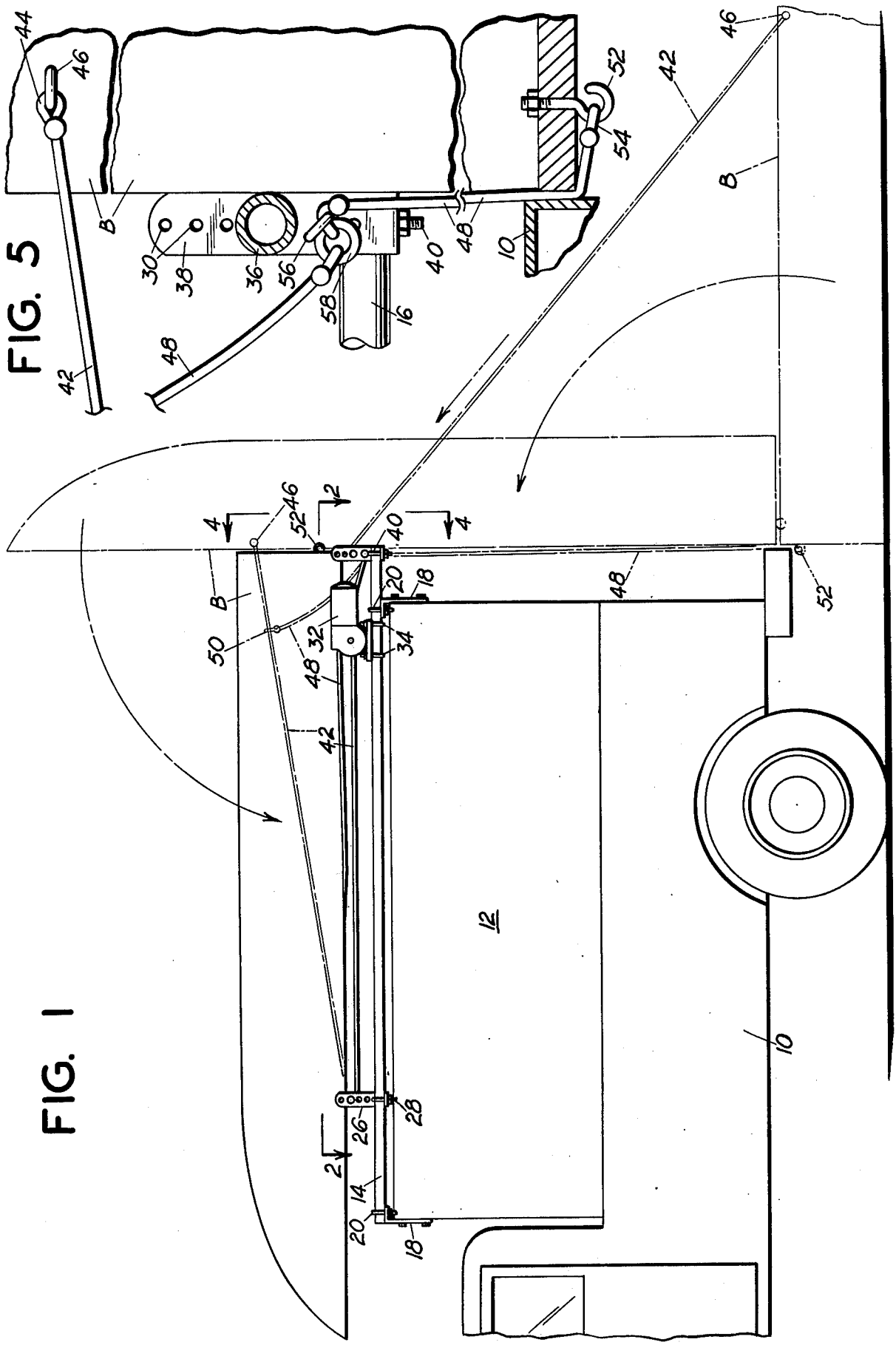

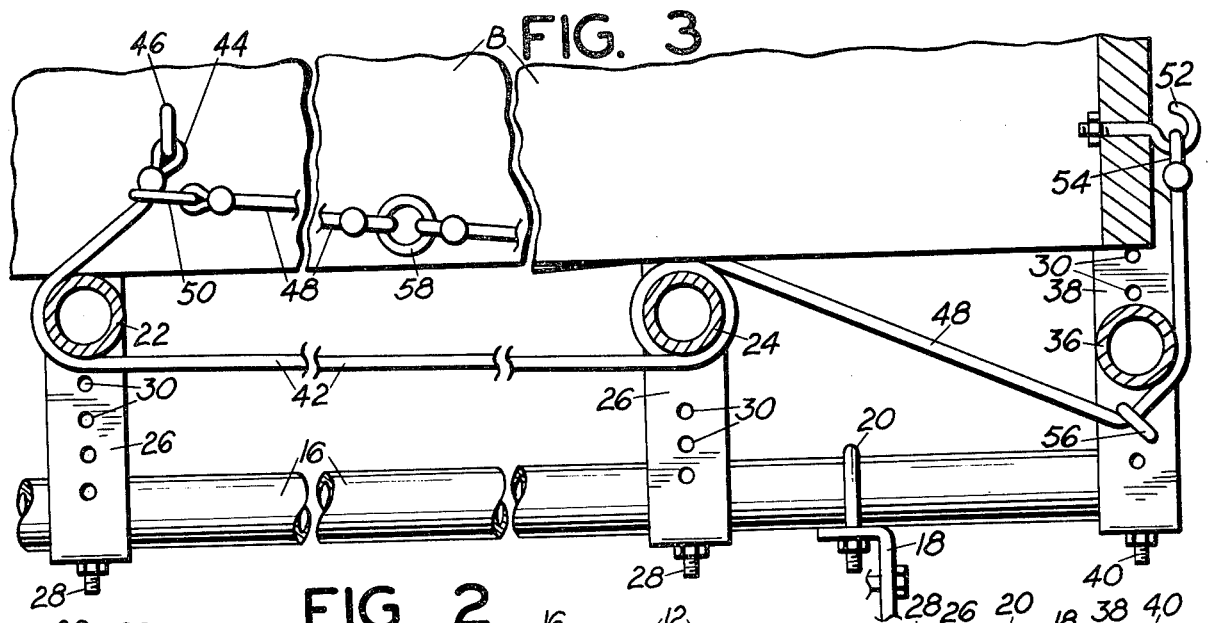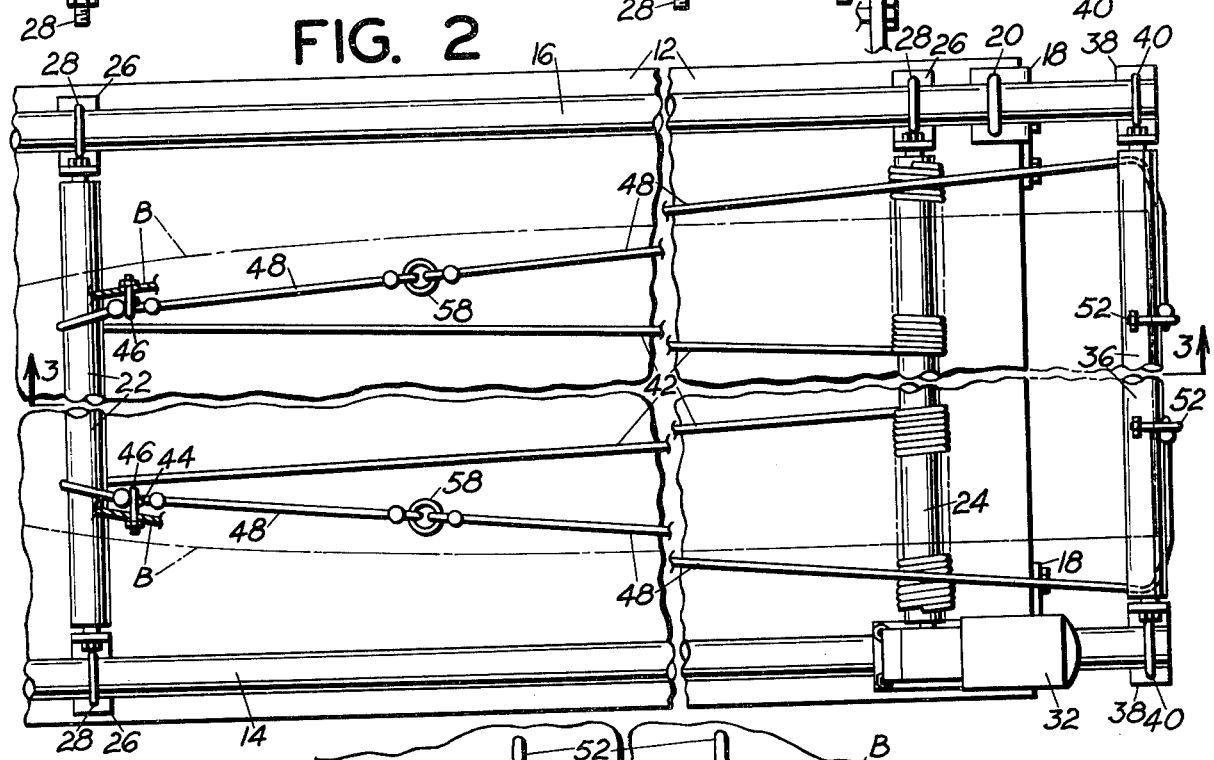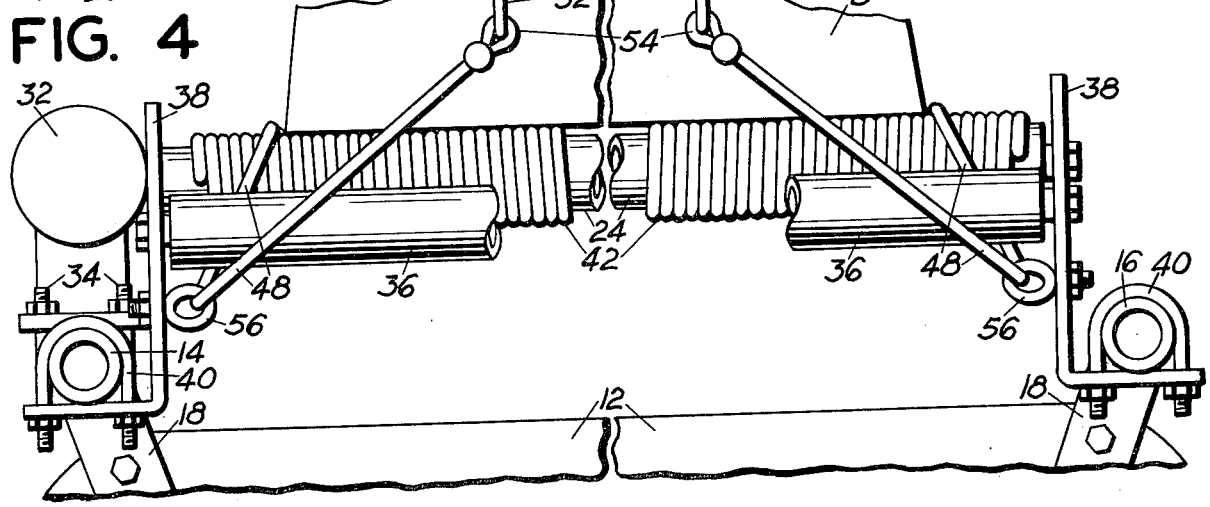

4,024,971

EQUIPMENT LOADER AND UNLOADER FOR VEHICLES

This is a continuation, of application Ser. No. 459,946, filed Apr. 11, 1974, now abandoned.

BACKGROUND OF THE INVENTION

This invention relates to new and useful improvements in equipment loading apparatus and more particularly pertains to apparatus for loading equipment on and unloading it from the top of a vehicle. Although the apparatus of the invention is illustrated herein as comprising a loader and unloader for boats, it is to be understood that it can as well be applied to other types of equipment which may be desired to be loaded on top of a vehicle.

Boat loading and unloading apparatuses have heretofore been provided for vehicles but such constructions are costly in their manufacture and difficult to install on the vehicle. In addition, such prior apparatuses require manual assistance at various stages throughout the loading or unloading operations. U.S. Pat. No. 3,612,314 solves many of the problems of prior devices in that it is substantially simplified in construction and furthermore is effective in loading or unloading a boat without any substantial manual assistance. The structure shown in such patent, however, has some deficiencies one of which is that once it is attached to a vehicle it is substantially limited or customized to a certain length of boat and particular vehicle configuration. Another disadvantage of the structure of the mentioned patent is that while the boat handling lines provide a hold down for the bow of the boat, the stern must be separately tied down.

SUMMARY OF THE INVENTION

According to the present invention and forming a primary objective thereof, a boat loader and unloader is provided employing apparatus capable of mounting it on a vehicle and which will accommodate almost all practical combinations and configurations of boats and vehicles.

Another object of the present invention is to provide a combination of winch and tie-down lines that not only serve to load and unload the boat but also to automatically hold the boat down at the bow and stern when it is fully loaded.

The invention will be better understood and additional objects and advantages will become apparent from the following description taken in connection with the accompanying drawings.

BRIEF DESCRIPTION OF THE DRAWINGS

FIG. 1 is a side elevational view of the equipment loader and unloader as applied to a vehicle, this view showing a boat in loaded position in full lines and in two partial unloaded positions in phantom lines;

FIG. 2 is a foreshortened fragmentary plan view taken on the line 2—2 of FIG. 1, the boat being shown in phantom lines and a portion thereof being in section;

FIG. 3 is an enlarged fragmentary sectional view taken on the line 3—3 of FIG. 2;

FIG. 4 is an enlarged foreshortened vertical elevational view taken on the line 4—4 of FIG. 1; and FIG. 5 is a fragmentary sectional view taken similar to FIG. 3 but showing the boat in partially loaded position.

DESCRIPTION OF A PREFERRED EMBODIMENT

The numeral 10 designates a vehicle and the numeral 12 represents a canopy on the vehicle upon which the present apparatus can be mounted. The type of vehicle shown in for illustration purposes only since the apparatus may be mounted on any type of vehicle where it is possible to mount front and rear brackets, as will be understood. Also, the apparatus is shown as being related to a loading and unloading apparatus for a boat B but it is to be understood that it can be used for other equipment such as boxes, containers, crates, lumber, etc.

A pair of rails 14 and 16 are supported at the top of the vehicle by brackets 18 suitably attached to the vehicle. The rails illustrated are circular but it is to be understood that they can be square or any other shape of suitable strength. These brackets may be bolted to the front, rear, sides or top as necessary and include U-bolts 20 thereon for securement to the rails.

The rails are disposed longitudinally of the vehicle in spaced relation and support transversely extending front and rear rollers 22 and 24, respectively, therebetween. These rollers have journaled support on upright brackets 26 secured to the rails by U-bolts 28. The rollers 22 and 24 are vertically adjustable on the brackets 26 by means of a plurality of holes 30 in the brackets. It is preferred that the brackets 26 extend a short distance above the rollers so as to provide confining means for a boat B supported on the rollers. The shaft for rear rollers 24 projects through one of the brackets 26 at one side and is secured to the output shaft of a reversible motor drive unit 32, this drive unit being secured to the one rail 14 by U-bolts. 34. Although the motor is shown as driving the rear roller 24, it is to be understood that it can as well be placed to drive the front roller. If desired, a hand crank can be used in lieu of the drive motor.

A third roller 36, referred to herein as a pivot roller, is also supported transversely between the rails 14 and 16, such roller being journaled in brackets 38 attached to said rails by U-bolts 40. As best seen in FIG. 3, the roller 36 is disposed in a slightly lower plane horizontally than the rear roller 24, the purpose of which will be described more fully hereinafter. Furthermore, the roller 36 is disposed rearwardly beyond the rear of the vehicle, so that the boat makes contact with this roller rather than with the upper portion of the vehicle during loading and unloading. For this purpose the rails 14 and 16 are long enough to extend rearwardly beyond the rear of the vehicle and installation is such that a straight line extending over the tops of rollers 24 and 36 will clear the vehicle. Brackets 38 have a plurality of holes 30 similar to brackets 26 for vertical adjustment of the roller 38.

The apparatus thus far described is arranged to load a boat after it has been positioned longitudinally rearward of the vehicle, with the stern of the boat being disposed adjacent to the vehicle. The apparatus functions to swing the bow of the boat arcuately upward and pull the boat over onto the rollers 22 and 24.

To accomplish these functions, a pair of winch lines 42, one on each side, has one of their ends anchored to the roller 24, FIGS. 2-4. These ends of the lines 42 are wrapped around the roller 24 so that the latter serves as a winch when rotated. The free ends of the lines extend forward from the roller 24 and pass under the front roller 22. The ends of the lines terminate in eyes 44 adapted to be engaged with respective eyes or hooks 46 secured to opposite sides of the interior of the boat forward of the longitudinal center of gravity of the boat. A full line fragmentary portion of the boat is shown in FIG. 2 to illustrate the securement of eyes 46 thereto.

Associated with the winch lines 42 are tie-down or support lines 48 each having a ring 50 secured on its forward end which slidably receives the respective line 42. Eyes 54 are provided at the rearward ends of lines 48 and are adapted to be releasably connected to respective hooks or eyes 52 secured to the transom of the boat. To maintain the rearward portion of the tie-down lines 48 laterally outwardly at the rear, they pass through the respective eyes 56 secured to the brackets 38. These eyes project inward from the inwardly directed surface of brackets 38. Incorporated into each line 48 at a selected place to be described, is a stop ring 58. This ring is larger than the eye 56 so that it will not pass therethrough.

The tie-down lines 48 are of a selected length such that when the boat is fully loaded on the vehicle, as shown in full lines in FIGS. 1, 3 and 4 and in phantom lines in FIG. 2, such tie-down lines are pulled tight so that as best seen in FIG. 3 they extend tightly between their connection with respective lines 42 adjacent to the eyes 46 and the hooks 52 at the stern of the boat. The rings 58 are selectively located such that the segment of the line 48 rearwardly thereof will stop engagement against the eyes 56 support the boat off the ground in a vertical partially loaded or unloaded position, preferably with the top edge of the transom at about the middle of the bumper where a camper type vehicle is used.

The operation of the apparatus will now be described. Assuming that the boat is to be loaded onto the vehicle, such boat is first positioned longitudinally rearward of the vehicle, as illustrated in the horizontal phantom line positions shown in FIG. 1, with the stern of the boat toward the vehicle. The boat is supported manually at the stern and the eyes 54 of the lines 48 engaged with the hooks 52. The eyes 44 of the winch lines 42 are attached to the hooks 46 at the forward portion of the boat. The operator then energizes the electric motor drive unit in the direction to haul in the winch lines 42 on the rear roller 24. As the lines are hauled in, they will stand the boat up with the bow upwardly. The boat is supported off the ground at the stern by the tie-down lines 48 during this time. Additional haul in of the lines 42 will pivot the boat over the pivot roller 36 and at about this time lines 48 will go slack. The boat will pivot over roller 36 until it engages roller 24 which will then serve as the fulcrum point. The rollers 24 and 36 are spaced and vertically positioned with relation to each other such that engagement of the roller 24 in the loading function occurs just about the time that the center of gravity of the boat is forward of roller 36. As the boat continues to be loaded, it falls forward. The roller 24 cushions such falling movement, since the boat center of gravity has not yet reached this roller. The two lines 42 are secured at points 46 below the top edges of the gunwales of the boat to avoid interference with roller 22. This arrangement makes sure that the boat will move over the top of the front roller and in addition it permits a gentle landing when the boat falls down on the front roller. Such gentle landing is accomplished by the initial engagement of the boat with roller 36 and then with roller 24.

As the winch lines 42 cinch up tight around the roller 22, the motor 32 is stopped, and in such position the boat is held down securely at the bow. Since the tie-down lines 48 are of selected length to become taut simultaneously with the cinching down of the bow of the boat and since they pass under roller 36 at this time, the stern of the boat will also be held down securely.

When unloading the boat, it is merely necessary to operate the drive motor 32 in the reverse direction from the loading operation. This rotates the roller 24 in a direction such that the friction engagement of the boat thereon moves it rearwardly. As the roller is rotated in the reverse direction, lines 42 release from the winch roller to allow the boat to move backwards. Lines 48 become slack at this time and the lines 42 merely slide through the rings 50. As the boat is driven rearwardly past its center of gravity, it will at first tip slightly over the back roller 24. Upon additional release of the lines 42 from roller 24, the boat will leave roller 24 and pivot over roller 36. It will then move downwardly by gravity to the vertical position shown in phantom lines in FIG. 1, and as it reaches the desired lowered position, stop rings 58 engage eyes 56 and support the boat. Thereafter, additional paying out of the lines 42 allow the bow of the boat to move down around the suspended support, such movement being pivotally provided by the lines 48. After the bow of the boat has reached the ground, it is merely necessary to release the lines from the hooks 46 and 52.

According to the invention, the use of the longitudinal side rails 14 and 16 facilitate use of the present apparatus with various sizes of boats and vehicles, such being accomplished merely by selected positioning of the roller support brackets 26 on the rails. The selected length of the support lines 48 and the particular positioning of the rings 58 therein are predetermined by the length and center of gravity of the boat, height of vehicle, and other variables. The roller 24, comprising the friction drive roller for moving the boat partially rearwardly in an unloading step, utilizes the winch wrappings of the lines 42 thereon to accomplish the friction connection with the boat.

It is apparent that no additional or auxiliary tie-down lines are necessary since both the bow and the stern will be securely cinched down on the rollers when the boat is loaded.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. An equipment loader and unloader for vehicles comprising
   a. a pair of elongated side rail assemblies,
   b. mounting means arranged to mount said rail assemblies on a vehicle,
   c. said rail assemblies being of sufficient length to extend beyond the vehicle on which they are mounted,
   d. front and rear transverse support means arranged to support equipment thereon in a loaded position and to load and unload equipment by pivotal movement over said rear support means,
   e. means attaching said front and rear support means to said side rail assemblies, f. at least one of said support means by its attaching means being adjustable along said side rail assemblies to accommodate equipment of different lengths, g. at least one of said transverse support means comprising a roller, h. rotary drive means engaging said roller for rotating the latter in a winch driving function, i. winch line means attached to said roller and having an end thereof arranged to be secured to a front portion of equipment to be loaded such that upon selected drive rotation of said roller the equipment is raised or lowered in pivoted relation over said rear support means, j. and a pivot roller supported on said rail assemblies rearward of the rear transverse support means and also beyond the vehicle whereby to form a pivot point for spacing equipment from the vehicle as it is raised and lowered relative to the vehicle.

2. The equipment loader and unloader of claim 1 wherein said pivot roller is disposed lower than said rear transverse support means.

3. An equipment loader and unloader for vehicles comprising
   a. front and rear transverse support means,
   b. mounting means arranged to mount said support means on a vehicle,
   c. said support means being arranged to support equipment thereon in a loaded position and to load and unload equipment by pivotal movement over said rear support means,
   d. at least one of said transverse support means comprising a roller,
   e. rotary drive means engaging said roller for rotating the latter in a winch driving function,
   f. winch line means attached to said roller and having an end thereof arranged to be secured to a front portion of the equipment to be loaded such that upon selected drive rotation of said roller the equipment is raised or lowered in pivoted relation over said rear support means on the vehicle,
   g. said winch line means extending under said front transverse support means and being arranged to hold the front of the equipment down in a loaded position thereof,
   h. and tie-down line means connected at its forward end to said winch line and arranged at its rearward end to be attached to a rearward portion of the equipment,
   i. said tie-down line means extending under said rear support means and being of a length such that in a loaded position of the equipment said tie-down line means is taut between said winch line means and the equipment to hold the latter down on said rear support means.

4. The equipment loader and unloader of claim 3 wherein said tie-down line means has a slidable connection at its forward end to said winch line means and said slidable connection is confined between the point of connection of said winch line means to the equipment and the span of the winch line means between such point of connection and the front transverse support means when the equipment is loaded whereby the front of said tie-down line means is anchored at its forward end in the loaded position of the equipment for the hold down function of the equipment at its rearward end.

5. The equipment loader and unloader of claim 3 including stop means secured to a rearward portion of at least one of said rail assemblies, said tie-down line means extending slidably through said stop means and having an enlargement which will not pass through said stop means whereby said tie-down means is arranged to support the equipment off the ground in a partially loaded position by engagement of said enlargement with said stop means.

6. The equipment loader and unloader of claim 3 wherein at least one of said support means by its attaching means is adjustable along said side rail assemblies to accommodate equipment of different lengths.

7. An equipment loader and unloader for vehicles comprising
   a. front and rear transverse support means arranged to support equipment thereon in a loaded position,
   b. mounting means arranged to mount said support means on a vehicle,
   c. a transverse pivot member disposed rearwardly of said rear transverse support means,
   d. mounting means arranged to mount said pivot member on said loader,
   e. winch line means having one end thereof arranged to be secured to equipment to be loaded,
   f. winch means on said loader and unloader connected to the other end of said line means and arranged to pivot equipment over said transverse pivot member in moving it from a rear unloaded position to a loaded position lying on said front and rear transverse support means,
   g. and support line means having one end thereof arranged to be secured to a rear portion of equipment to be loaded and having its other end engageable with the rear of said loader,
   h. said support line means being arranged to support a rear portion of equipment above the ground before the equipment is pivoted over the transverse pivot member in a loading function.

8. The equipment loader and unloader of claim 7 wherein said transverse pivot member is disposed in a lower plane than said rear transverse support means.

* * * * *